May 30, 1950 M. A. EDWARDS ET AL 2,509,731
GOVERNING APPARATUS
Filed Feb. 1, 1946
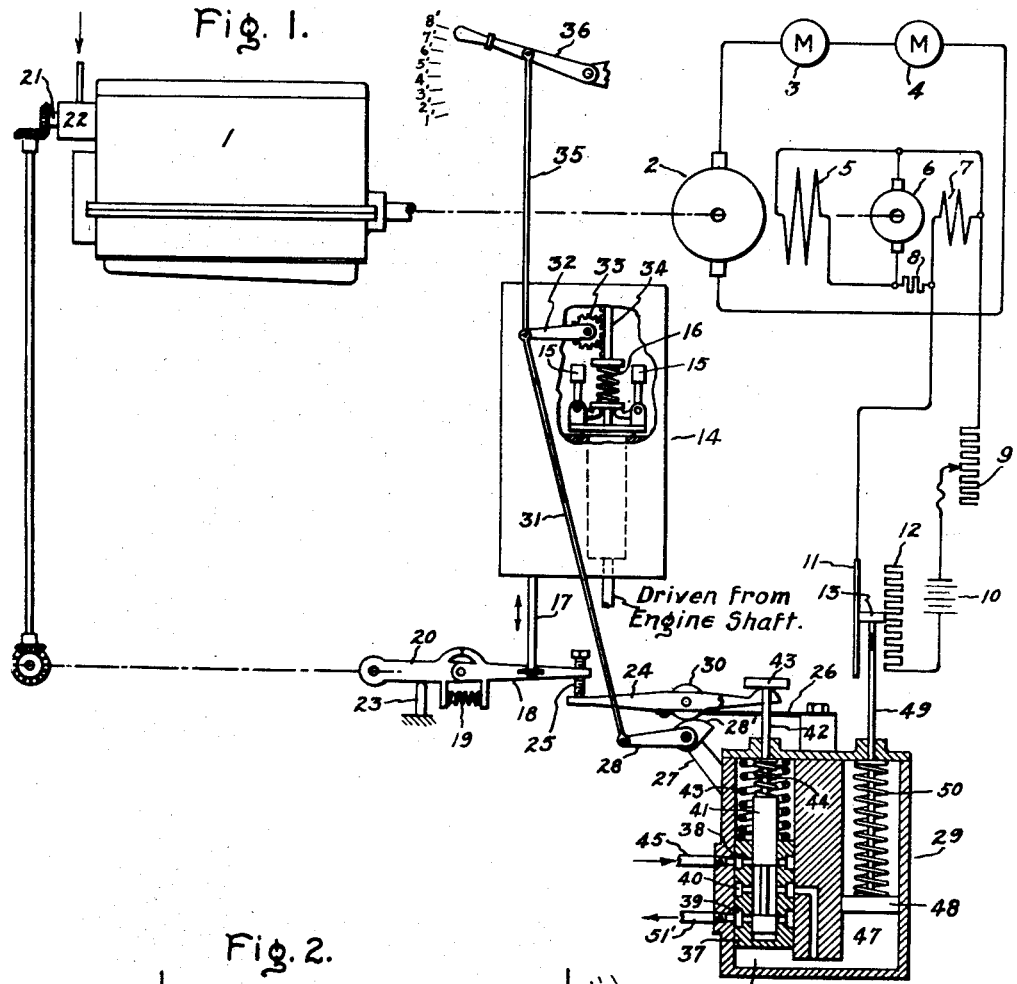
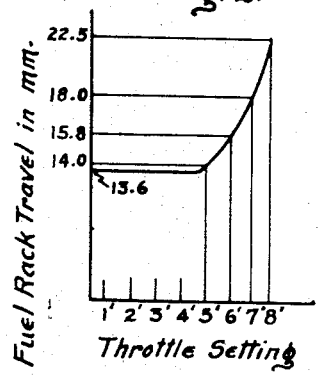
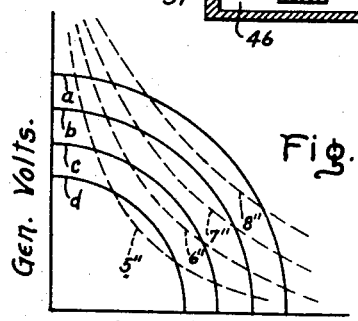
Inventors
Martin A. Edwards
Carl B. Lewis
by Harwell E. Mack
Their Attorney Patented May 30, 1950

2,509,731

UNITED STATES PATENT OFFICE 2,509,731

GOVERNING APPARATUS

Martin A. Edwards, Scotia, N. Y., and Carl B. Lewis, Erie, Pa., assignors to General Electric Company, a corporation of New York Application February 1, 1946, Serial No. 644,942

6 Claims. (Cl. 290—40)

Our invention relates to a regulating and governing apparatus for an internal combustion engine driving an electric generator and is particularly adapted to a governing system for Diesel electric drive locomotives.

In obtaining the maximum efficiency of a Diesel-driven electric generator power system, it can be shown that the Diesel engine should be operated at rated speed in order to secure its maximum horsepower output. In the event the electric generator is not requiring maximum horsepower input, then considerable loss of efficiency in the Diesel engine takes place. On the other hand, if the torque demanded of the engine by the electric generator is greater than the engine is capable of delivering, it will result in reducing the engine speed and ultimately stalling the engine. Various systems have been developed to control the output of the electric generator by adjustment of the generator field excitation, such regulation usually being accomplished by means of a speed-responsive governor designed to maintain the engine speed constant and also to effect appropriate changes in the field excitation circuit by means of relays and control devices. A number of other variables also enter into the problem of obtaining regulation of the generator field excitation, among these being the variation in field winding resistance due to temperature changes, and variation in the ability of the engine to deliver its rated output due to atmospheric conditions, age of the engine, amount of wear and quality of maintenance of the engine. It is, therefore, desirable that any system designed for regulating a Diesel-electric generator power system should provide for automatic regulation to secure maximum utilization and provide compensation for the above-mentioned variable quantities. It is also highly desirable that the regulating action be accurate and effective at constant horsepower levels other than maximum rated horsepower output; that is, the fuel consumption and load limit should be controlled effectively at engine speed levels less than maximum, and such recalibration should be made automatically operative in accordance with the position of the operator's throttle corresponding to the operating speed desired.

Accordingly, it is an object of our invention to provide a governing apparatus for an electric generator driven by an internal combustion engine that is simple, reliable and accurate in its regulating operation.

It is also an object of our invention to provide a regulating apparatus for an engine driven generator power system in which the excitation of the generator and the fuel supply to the engine are regulated to secure maximum operating utilization of the internal combustion engine.

It is a still further object of our invention to provide a governing system for an internal combustion engine supplying power to an electric generator which will prevent overloading of the engine and adjust the engine to operate at maximum utilization and which may be instantly recalibrated to provide the same measure of control at speed and output levels less than the maximum rated speed and output as at the rated maximum speed and output of the engine.

In carrying our invention into effect, we provide means whereby the field excitation for the exciter generator which supplies field current to the main generator, is automatically regulated in accordance with the operation of the governor apparatus used for speed and fuel supply control of the internal combustion engine. Provision is also made for instant recalibration of our control system simultaneously with the movement of the operator's throttle to provide optimum regulating characteristics when the engine is being operated at values of speed and output less than the maximum rated values.

For a better and more complete understanding of our invention, reference should now be had to the following specification taken in connection with the accompanying drawing, and its scope will be pointed out in the appended claims. In the drawing, Fig. 1 is a simple diagrammatic illustration of a preferred embodiment of our invention, and Figs. 2 and 3 are graphical representations of certain of the performance and operating characteristics of a power system regulated in accordance with our invention.

Referring now to Fig. 1, we have shown an internal combustion engine 1 arranged to drive an electric generator 2 having an output circuit for supplying electric current to a pair of traction motors 3 and 4, respectively. While we have shown a pair of motors, it should be understood that any number of motors, in either series or parallel relationship or a combination thereof, may be desirable for certain applications. For excitation of the main generator 2, we have provided a field winding 5 arranged to be supplied current from an exciter generator 6 which preferably may be also driven by the engine 1. A shunt field winding 7 is provided for energizing the exciter 6, and a resistance 8 is provided in series with the shunt field winding in order to limit the current supplied by the exciter 6 to its shunt field winding 7 to a value substantially less than that required for full field excitation. Also arranged in parallel circuit relationship with the shunt field winding 7 is a variable resistance 9, a battery or other constant potential source 10 and a variable resistance of the straight line commutator type having a current conducting bar or strip 11, a series of resistance elements 12 and a contact shoe 13 disposed between the conducting strip 11 and the commutator segments of the resistance 12 for varying the amount of resistance provided by the device, depending on the position of the movable contact shoe 13. The excitation of the exciter by its shunt field 7 therefore depends, up to a certain predetermined minimum value, on the self excitation provided by a portion of the armature current flowing through the resistance 8 and field winding 7. The value of the variable resistance 9 is set so that the voltage appearing across the field 7 due to the battery 10 will exceed the voltage across the field 7 due to self excitation from the exciter 6, in the normal field excitation range under operating conditions. Therefore, in the operating range the field 7 is energized to an extent depending on the value of resistance in the battery circuit, or, directly proportional to the position of the commutator type rheostats 11, 12 and 13. A governor 14, which may be any conventional type of spring-loaded speed responsive governor shown representatively in the drawing as a pair of centrifugally operated flyballs 15 and a restraining spring 16, is arranged to be driven mechanically by the engine 1 so that it is at all times driven at a speed directly proportional to the engine speed. The fuel rack operating rod 17 of the governor is connected to a broken link mechanism having an overtravel member 18 which is spring biased by means of a compression spring 19 to the base part of the link member 20. The member 20 is connected through any suitable mechanical means, such as the shafts and gearing shown, to the shaft 21 which operates the fuel control valves or racks shown diagrammatically as a part 22 of the engine 1. A mechanical stop 23 is provided to limit the travel of the arm 20 to a value corresponding to the maximum travel of the fuel rack 22 at rated maximum speed. At the right hand end of the over-travel link 18, as viewed in the drawing, an adjusting screw 25 is provided for making contact with a floating pivot lever 24. Lever 24 is resiliently supported by a flat spring member 26 so that the pivot point or fulcrum of lever 24 may be raised or lowered but will be restrained from any lateral or endwise movement. In order to provide for the vertical adjustment of the lever 24, a bracket 27 is mounted on the hydraulic control unit 29, and supports an actuating arm 28 having a cam surface 28'. The cam surface 28' engages with a roller 30 mounted on the pivot of lever 24, thereby forming an adjustable fulcrum for the lever 24. The actuating cam arm 28 is connected by a link 31 to the tension adjusting means for the spring 16 of the governor comprising a lever arm 32, a pinion 33 and rack 34 for varying the amount of compression placed on the spring 16. The lever arm 32 is also mechanically connected by a link 35 to the operator's throttle or control handle 36 which may be placed at any convenient location, preferably in the operator's cab of the locomotive. The system formed by the throttle 36, the connecting link 35 and the tension-adjusting means for the governor spring 16 therefore functions to set or determine the operating speed of the internal combustion engine by adjusting the speed response of the governor 14. We have shown diagrammatically a series of numbered notches or positions arranged to be used as a speed guide by the operator, said notches being numbered from 1', corresponding to minimum speed of the engine and progressing up to 8', corresponding to maximum rated speed of the engine. From this system of linkages mechanically connecting the operator's throttle with the governor spring tension adjustment and with the cam surface 28' on the hydraulic unit, it can be seen that as the throttle is moved, say in the maximum speed direction, the governor spring is automatically adjusted for this speed and also the lowest portion of the cam surface 28' is brought into contact with the roller 30, thereby lowering the operating fulcrum of the lever 24. By this means the calibration of the control system is effected, as will be more fully described subsequently. The hydraulic control unit 29 is comprised of a cylinder having a sleeve valve 37 arranged with an inlet port 38, a drain port 39, and a port 40 for transmitting hydraulic pressure to another cylinder in the same housing. Within the sleeve valve 37 is arranged a pilot valve 41 having an operating extension 42 with a shoulder or cap 43 on the upper end thereof designed to be engaged by the right end of the lever 24. Both the sleeve valve 37 and the pilot valve 41 are biased to a downward position by means of helical coil springs 43 and 44, respectively. Oil under pressure is supplied from the lubricating oil system of the engine through the pipe 45 to the hydraulic control unit 29. During stable operation the inlet port 38 normally will be closed by the pilot valve 41; however, when the pilot valve is lifted, oil is allowed to pass through the inlet port 38 into the annular space surrounding the pilot valve and also pass through the port 40 into the space 46 beneath the head of the sleeve valve 37 and space 47 beneath the slave piston 48, thus exerting operating force on both the sleeve valve and on the slave piston. The slave piston 48 has its piston rod 49 mechanically connected to, but electrically insulated from, the contact shoe 13 forming a part of the straight line commutator type variable resistance element. A helical spring 50 is disposed within the cylinder to bias the slave piston to its downward position corresponding to the minimum resistance value of the rheostat and providing for maximum excitation of the exciter field 7 and consequently maximum output of the generator.

The action of the hydraulic control unit will be understood from the following operating description. Oil under pressure from the engine lubricating oil supply is always available at the inlet port 38. If the control or pilot valve 41 is now slightly raised, the port 38 will be uncovered and oil under pressure will fill the annular space surrounding the pilot valve and also be transmitted into the spaces 46 and 47. This transmitted oil pressure will force the slave piston 48 upward, thereby moving the contact shoe upward along the rheostat commutator reducing the field excitation, and at the same time will force the sleeve valve 37 upward until the inlet port 38 has again been sealed by the relative displacement of the inlet port 38 of the sleeve valve with the upper shoulder of the pilot valve 41. The drain port 39 remains sealed by the lower shoulder of the pilot valve during this operation. Thus the operation ceases and the slave piston 48 stops as soon as the sleeve valve 37 has moved the distance required to again seal off the inlet port 38 depending on the initial displacement of the pilot valve 41. The movement of the slave piston 48 is therefore proportional to the initial movement of the pilot valve 41 but of greater magnitude. In the reverse of this operation, if the pilot valve 41 is now depressed, the outlet port 39 of the sleeve valve 37 will be uncovered and oil will be drained out through the oil drain line 51 from the spaces 46 and 47 by reason of the biasing springs 43 and 50 forcing the sleeve valve 37 and the slave piston assembly 48, respectively, downward, and the rheostat contact arm 13 will be actuated an amount proportional to the movement of the pilot valve 41.

The control mechanism is adjusted so that with the engine running at maximum rated speed and the fuel control 22 set to provide maximum horsepower output, the value of the resistance 9 in the exciter field circuit is adjusted so that the generator 2 will supply maximum rated output. When operating under these conditions, the link assembly 18 and 20 will be resting against the mechanical stop 23, corresponding to the full fuel supply position of the fuel racks, and the adjusting screw 25 will be in engagement with the lever 24, but exerting no force on the lever. If the generator now makes a demand for further power output from the engine, the engine will tend to slow down and the governor will act to remedy this speed deficiency by moving the operating rod 17 downward in a direction to supply more fuel. Since the fuel racks are in their maximum travel position and the arm 20 is resting against the mechanical stop, the over-travel link 18 will continue to move downward against the compression of the biasing spring 19. As the link 18 moves downward, the lever 24 is actuated and the pilot valve 41 raised, permitting oil pressure to enter and raise the slave piston 48 a corresponding amount. Raising the slave piston slides the contact shoe 13 upward and inserts more resistance in the exciter field, thereby reducing the output of the exciter which, in turn, reduces the excitation of the main generator and consequently its output to a safe value where the engine speed may be maintained at its maximum rated value, and stability is obtained. When the reverse of this situation occurs, that is, when the generator demand decreases, the engine will tend to speed up and the governor will act in the opposite direction to reduce the amount of fuel supplied to the engine. At the same time the over-travel link 18 will be raised and the pilot valve 41 will be correspondingly lowered or returned to its original position. This uncovers the oil drain port 39 and allows the slave piston 48 and its associated rheostat contact arm 13 to return to the lower position, thereby decreasing the resistance in the exciter field circuit and increasing the current supplied to the field of the main generator. Thus the power output of the main generator is restored to a condition of equilibrium with the power being supplied from the engine, and at the same time the fuel racks 22 and adjusted to maintain the maximum rated speed and constant horsepower output under these conditions.

The operation of the calibration feature of our invention will now be described. Reference now should be had to Fig. 2 which shows the approximate maximum allowable fuel rack travel in millimeters for each notch of the operator's throttle 36. Thus it can be seen that the fuel rack setting is adjusted for the speed notches 5' to 8', inclusive, to provide the maximum allowable amount of fuel necessary for maximum allowable engine output at the speed values corresponding to those throttle settings. On Fig. 3, we have shown the performance characteristics of the generator, solid line curves a to d, and the output characteristics of the engine, dotted line curves 8" to 5", corresponding to the throttle notches 8' to 5' respectively. It can be seen by examination of Fig. 3 that when the throttle is, for example, placed in notch 8', the demand curve a of the generator and the output curve 8" of the engine are matched as nearly as is possible in a system of this kind. The same relationship obtains for the performance characteristics obtained with the throttle set in notches 7', 6' and 5', corresponding to lower operating speeds of the engine, and as shown by the respective engine and generator curves on Fig. 3. The means for accomplishing this consists of the mechanical actuating means connecting the throttle 36 with the governor tension spring adjustment means and with the actuating arm 28 and its cam surface 28'. For example, when the throttle is in notch 8', the governor spring is tensioned to hold maximum rated speed and the cam 28' is rotated so that its lowest point engages the roller on the pivot of lever 24. In this position lever 24 is not actuated by the over-travel link 18 until the arm 20 has reached a position of maximum fuel oil input of the fuel racks, or until it is against the mechanical stop. Thus the automatic load control feature does not become operative until the over-travel link 18 exceeds the position of maximum fuel input which, in effect, corresponds with overloading of the engine at maximum rated speed. The performance characteristics of the engine and generator operating under these conditions are shown by the curves labeled a and 8" on Fig. 3. If the operator's throttle is now moved, for example, to notch 6', corresponding to an engine operating condition of reduced speed and output, the cam surface 28' is accordingly rotated and the pivot or fulcrum of lever 24 is raised a corresponding amount. Under these conditions the adjusting screw 25 on the over-travel link 18 engages the lever 24 at a point corresponding to the proper engine speed and fuel rack position for speed notch 6' on the engine throttle. Any further generator demand reduces the engine speed and results in the governor demanding more fuel; the linkage 18 is depressed raising the pilot valve 41 a corresponding amount, and the hydraulic control unit operates as described before, thereby decreasing the field excitation on the main generator and decreasing the load demand on the engine to its proper maximum value allowable under the reduced speed conditions of throttle position 6'. In this case, the performance of the engine and generator is shown graphically by the curves 6" and c, respectively, of Fig. 3. This recalibration of the regulatory action thus takes place in corresponding amounts for each position of the throttle from notch 5' through 8', inclusive. It can be seen that our governing system therefore provides load limit and fuel control at any desired speed and output operating level of the engine-generator power system thereby preventing overloading of the engine and consequent excessive cylinder pressures at reduced speeds. For purposes of illustration, we have arbitrarily shown our invention as applied to four levels of speed and output of the power system, but it is obviously not limited to the particular examples shown.

Although it has been found that our invention operates very satisfactorily using the engine lubricating oil supply as a source of oil pressure for the hydraulic control unit, it may be understood that the fuel oil supply, which is also under pressure, may be used for operating the hydraulic control system. In certain cases this may be desirable, due to extreme temperature variations, since the oil customarily used for engine fuel has a more constant viscosity than lubricating oil under temperature variations.

Due to the time lag involved in the operation of the hydraulic control unit, it will be found that there is generally no hunting or oscillation in the system during the regulating operation. The time required for the slave piston to reach its final position is usually sufficiently great so that the load is increased or decreased gradually, depending on the action of the governor, and there is very little possibility of the engine and generator undershooting or overshooting their steady state condition. Another design feature that tends to eliminate hunting of the system is the relatively large size of the slave piston 48 compared to the size of pilot valve 41. Thus any tendency of the governor and pilot valve to hunt is smoothed out in the movement of the slave piston which reacts proportionately less, and with a time lag, thereby preventing oscillation of the field excitation circuit.

It will be apparent therefore that we have provided an automatic regulating system for an engine-driven generator power system in which load control and fuel limit are automatically regulated to allow the system to operate at maximum utilization, and that also the regulating system is automatically adjusted or calibrated by movement of the operator's control throttle to provide the same maximum operating performance under various operating conditions in the lower speed ranges.

While we have shown and described a particular embodiment of our invention, it will be obvious to those skilled in the art that changes and modifications may be made therein without departing from our invention in its broader aspects, and we, therefore, aim in the appended claims to cover all such changes and modifications as fall within the true spirit and scope of our invention.

What we claim as new and desire to secure by Letters Patent of the United States is:

1. Regulating apparatus for a power system comprising an internal combustion engine, an electric generator driven by said engine and connected to supply current to an electrical load, a field winding for said generator, means for energizing said field winding, regulating means for said field winding, adjustable governing apparatus for controlling the fuel supply to said engine, control means coacting with said governing apparatus and comprising a lever having a spring biased joint for initially controlling said fuel supply means responsive to actuation of said governing apparatus and comprising a manually adjustable linkage for operating said field regulating means after a predetermined time delay substantially corresponding to the time required to make the desired fuel adjustment thereby to prevent further adjustment of said fuel supply upon the attainment of a predetermined maximum condition of load on said engine, and second means arranged to be responsive to adjustment of said governing apparatus to adjust said control means and to select said maximum condition of load upon said engine in accordance with said adjustment of said governing apparatus.

2. A regulating system for a power apparatus comprising an internal combustion engine, an electric generator driven by said engine and arranged to supply current to an electrical load, a field winding for said generator, means for varying the excitation supplied to said field winding, a governor apparatus responsive to the speed of said engine and arranged to control the fuel supply to said engine in response to speed variations thereof, means for selecting a desired standard of engine speed, means operatively connecting said governor apparatus and said excitation control means with said speed selector means to adjust said excitation means and fuel supply means to maintain said selected standard of engine speed, said means including a control lever assembly having a first part capable of limited travel and a second part connected to said governor and capable of a greater degree of travel than said first part and arranged to operate said excitation control means in the region of overtravel.

3. A governor system for a power apparatus comprising an internal combustion engine, a fuel supply means therefor, an electric generator driven by said engine and arranged to supply current to an electrical load, means for supplying excitation to said generator, governor means responsive to the speed of said engine for controlling the fuel supply to said engine, means for selecting a desired standard of speed and power output for said engine, said selecting means coacting with said speed responsive means and with said excitation supply means to change the standard of operation at which both last named means become operative, means operatively connecting said governor means to the fuel supply means, and means for rendering ineffective said last mentioned means in response to a predetermined load condition on said power apparatus.

4. A regulating system for a self-propelled electric vehicle comprising an internal combustion engine, a fuel supply means therefor, an electric generator driven by said engine and arranged to supply current to a traction motor for driving said vehicle, a field winding for said generator, means for varying the excitation supplied to said field winding, a governor apparatus responsive to the speed of said engine for controlling the fuel supply to said engine, means operatively connected with said governor to adjust the excitation supplied to said field winding in response to a speed condition of said engine, means for selecting the standard of operation at which said last named means becomes operative to adjust said fuel supply means and said excitation control means, and means for limiting the fuel supply to said engine to a predetermined maximum rated value.

5. Regulating apparatus for a power system comprising an internal combustion engine, an electric generator driven by said engine and connected to supply current to an electrical load, a field winding for said generator, means for energizing said field winding, regulating means for said field winding, governing apparatus for controlling the fuel supply to said engine, means for adjusting said governing apparatus and to select a desired standard of engine speed, lever means coacting with said governing apparatus and said field regulating means to reduce the excitation of said generator upon the attainment of a predetermined maximum load condition on said engine, and cam means controlled by said adjusting means and operating to adjust said lever means and to select in accordance with the setting of said adjusting means the load condition at which said lever means will reduce the excitation on said generator.

6. A governing apparatus for a power system comprising an internal combustion engine, an electric generator adapted to be driven by said engine and arranged to supply current to an electric load, excitation means for said generator, a hydraulic power unit arranged to vary said excitation means, said power unit comprising a servomechanism having an output slave piston and an input responsive pilot piston and said servomechanism having a sleeve valve arranged around said pilot piston to provide a follow-up in the movement of said pilot piston with respect to movement of said slave piston thereby to prevent hunting of said servomechanism, adjustable governor means arranged to be responsive to the speed of said engine, means including a mechanical linkage from said governor means for varying the fuel supplied to said engine, means including a manually adjustable linkage adapted to be actuated from said governor means after a manually predetermined interval of time of movement to operate said pilot valve of said hydraulic power unit, said linkage including a fulcrum point, means for manually adjusting said governor means to select the desired standard of engine speed, and a linkage from said last-mentioned means to an eccentric cam arranged to vary said fulcrum point of the linkage arranged to actuate said pilot valve thereby to select, in accordance with the setting of said governor adjusting means, the condition at which said governor apparatus will reduce the excitation of said generator.

MARTIN A. EDWARDS.
CARL B. LEWIS.

REFERENCES CITED

The following references are of record in the file of this patent:

UNITED STATES PATENTS

| Number | Name | Date |
|---|---|---|
| 1,216,237 | Lemp | Feb. 13, 1917 |
| 1,585,351 | Ionides | May 18, 1926 |
| 1,799,096 | Guernsey | Mar. 31, 1935 |
| 2,025,523 | Neuland | Dec. 24, 1935 |
| 2,050,068 | Schaer | Aug. 4, 1936 |
| 2,085,763 | Neuland | July 6, 1937 |
| 2,131,527 | Sousedik | Sept. 27, 1938 |
| 2,152,025 | Brunner | Mar. 28, 1939 |
| 2,175,681 | Brunner | Oct. 10, 1939 |
| 2,178,355 | Brunner | Oct. 31, 1939 |
| 2,210,675 | Kother | Aug. 6, 1940 |
| 2,256,294 | Schlapfer | Sept. 16, 1941 |
| 2,424,121 | Schlapfer | July 15, 1947 |